United States Patent
Thies et al.

(10) Patent No.: US 9,545,161 B2
(45) Date of Patent: Jan. 17, 2017

(54) ARTICLES COMPRISING POROUS COATINGS

(75) Inventors: Jens Christoph Thies, Maastricht (NL); Patrick Wilhelmus Antonius Vrijaldenhoven, Stein (NL); Hermanus Adrianus Langermans, Eindhoven (NL)

(73) Assignee: DSM IP ASSETS B.V., Heerlen (NL)

( * ) Notice: Subject to any disclaimer, the term of this patent is extended or adjusted under 35 U.S.C. 154(b) by 1796 days.

(21) Appl. No.: 12/160,644

(22) PCT Filed: Feb. 12, 2007

(86) PCT No.: PCT/EP2007/001178
§ 371 (c)(1),
(2), (4) Date: Nov. 10, 2009

(87) PCT Pub. No.: WO2007/093340
PCT Pub. Date: Aug. 23, 2007

(65) Prior Publication Data
US 2010/0167009 A1   Jul. 1, 2010

(30) Foreign Application Priority Data

Feb. 14, 2006 (EP) .................................. 06075305
Nov. 10, 2006 (EP) .................................. 06023433

(51) Int. Cl.
| | | |
|---|---|---|
| B05D 5/06 | (2006.01) |
| A47G 1/06 | (2006.01) |
| G02B 1/10 | (2015.01) |
| G02B 1/11 | (2015.01) |
| C03C 17/00 | (2006.01) |
| B82Y 20/00 | (2011.01) |
| G02B 1/111 | (2015.01) |

(52) U.S. Cl.
CPC .................. *A47G 1/06* (2013.01); *B82Y 20/00* (2013.01); *C03C 17/007* (2013.01); *G02B 1/10* (2013.01); *G02B 1/11* (2013.01); *G02B 1/111* (2013.01); *C03C 2217/425* (2013.01); *C03C 2217/45* (2013.01); *C03C 2217/475* (2013.01); *C03C 2217/732* (2013.01); *G02B 2207/101* (2013.01); *Y10T 428/24355* (2015.01); *Y10T 428/24942* (2015.01); *Y10T 428/24998* (2015.04); *Y10T 428/249978* (2015.04); *Y10T 428/25* (2015.01); *Y10T 428/265* (2015.01); *Y10T 428/31504* (2015.04); *Y10T 428/31507* (2015.04); *Y10T 428/31786* (2015.04); *Y10T 428/31935* (2015.04)

(58) Field of Classification Search
CPC ... A47G 1/06; C03C 17/007; C03C 2217/425; C03C 2217/732; G02B 1/10; G02B 1/11; Y10T 428/24942; Y10T 428/25; Y10T 428/24355; Y10T 428/265
USPC .................................................. 427/160–169
See application file for complete search history.

(56) References Cited

U.S. PATENT DOCUMENTS

| | | | | |
|---|---|---|---|---|
| 5,580,819 | A * | 12/1996 | Li et al. ......................... 427/167 |
| 5,817,421 | A | 10/1998 | Oishi et al. |
| 5,847,795 | A * | 12/1998 | Satoh et al. ................... 349/137 |
| 5,853,809 | A * | 12/1998 | Campbell et al. ......... 427/407.1 |
| 2001/0016253 | A1 | 8/2001 | Goda et al. |
| 2001/0034294 | A1* | 10/2001 | Peuchert et al. ................ 501/66 |
| 2002/0122962 | A1* | 9/2002 | Arfsten et al. ................ 428/697 |
| 2004/0016914 | A1* | 1/2004 | Matsuda et al. .............. 252/500 |
| 2004/0216487 | A1 | 11/2004 | Boire et al. |
| 2006/0269733 | A1 | 11/2006 | Mizuno et al. |

FOREIGN PATENT DOCUMENTS

| | | |
|---|---|---|
| EP | 0 386 341 | 9/1990 |
| EP | 1 342 702 | 9/2003 |
| EP | 1 403 918 | 3/2004 |
| EP | 1 591 804 | 11/2005 |
| EP | 1 739 116 | 1/2007 |
| EP | 1 787 959 | 5/2007 |
| WO | 97/12280 | 4/1997 |

OTHER PUBLICATIONS

International Search Report for PCT/EP2007/001178, mailed Sep. 6, 2007.

* cited by examiner

*Primary Examiner* — Michael Wieczorek
*Assistant Examiner* — Michael G Miller
(74) *Attorney, Agent, or Firm* — Nixon & Vanderhye P.C.

(57) ABSTRACT

The invention relates to an article comprising a substrate and a nano-porous coating, wherein the reflectivity of the article is less then 2%, and whereby the amount of sodium measured in the coating by XPS is less then 1 wt %, and further to a method of making the article.

20 Claims, No Drawings

ARTICLES COMPRISING POROUS COATINGS

This application is the U.S. national phase of International Application No. PCT/EP2007/001178, filed 12 Feb. 2007, which designated the U.S. and claims priority to Europe Application No. 06075305.0, filed 14 Feb. 2006, and Europe Application No. 06023433.3, filed 10 Nov. 2006, the entire contents of each of which are hereby incorporated by reference.

The invention relates to coating compositions and process, uses, and methods thereof. In particular, the present invention relates to porous coatings based on nano-particles and oxidised metal compound forming a binder for the particles.

The use of nano-particles to make an anti-reflective coating has been known since the 1940's (U.S. Pat. No. 2,432,484). The optical function is achieved by the effective refractive index of the coating being lower than that of the substrate leading to a gradient of refractive index from that of air to that of the substrate. This leads to a reduction in the amount of light reflected. U.S. Pat. No. 6,921,578 describes a method for preparing anti-reflective coating systems in which a binder (e.g. tetra-ortho-silicate TEOS) is hydrolyzed in the presence of the nano-particles while using an acid catalyst. While this approach can lead to a coating with anti-reflective properties it suffers from a number of draw backs.

It has surprisingly being found that coatings with good, reproducible properties may be achieved by the use of a porous coating comprising nano-particles and a metal oxide based binder. While not wishing to be bound by theory it is thought that the nano-particles form a more stable coating composition with the binder which stability is, surprisingly, further conferred upon the coating when applied to a substrate.

These coatings have initially good properties such as anti-reflectiveness. However, after some time the properties can deteriorate. GB2424382 describes the change of reflectivity over time of mesoporous antireflective layers on plastic substrate like PET. The application proposes adding water in order to stabilize the reflectivity, or, alternatively, adding hygroscopic materials in order to attract water from the environment. However, the inventors found the addition of hygroscopic material to have a deleterious effect on the properties of the coating, The present invention relates articles having more stable and consistent properties and to methods of making such articles.

SUMMARY OF THE INVENTION

In one embodiment the present invention relates to an article comprising a substrate and a porous coating, wherein the reflectivity of the article is less then 2%, and whereby the amount of sodium measured in the coating by XPS is less then 1 wt %.

In another embodiment of the invention, the substrate comprises between 0 and 7 wt % of sodium.

In another embodiment of the invention the article of the present invention comprises a blocking layer, which is deposited between the substrate and the porous coating, which blocking layer prevents substantial migration of sodium from the substrate to the porous coating.

In another embodiment of the invention, an article is made according to the process comprising the steps of:

(i) reacting nano-particles with an amount of surface modifying agent;
(ii) pre-hydrolysing a binder;
(iii) mixing the surface modified particles from step (i) with the pre-hydrolysed binder from step (ii);
(iv) applying the coating composition to a substrate;
(v) curing the coating;
(vi) and washing the cured coating with water.

DETAILED DESCRIPTION OF THE INVENTION

The article of the present invention comprises at least a substrate and a porous coating. It is highly preferred that the porous coating be an anti-reflective coating.

The substrate is preferably an inorganic material preferably glass or quartz. Preferred is float glass. Generally, a substrate has a thickness of about 0.5 mm or more, preferably about 1 mm or more, more preferably, about 1.8 mm or more. Generally, the substrate has a thickness of about 20 mm or less, preferably about 10 mm or less, more preferably about 6 mm or less, more preferably still about 4 mm or less, and even more preferably, about 3 mm or less.

The substrate preferably has a high transparency. Preferably the transparency is about 94% or higher at 2 mm thickness and at wavelength between 425 and 675 nm, more preferably about 96% or higher, even more preferably about 97% or higher, even more preferably about 98% or higher.

In one embodiment of the invention the substrate is glass and comprises a low amount of sodium, preferably between 0 and 7 wt %, more preferably between 0.1 and 5 wt %. Unexpectedly, the low amount of sodium seems to prevent deterioration of the properties of the coating.

In a preferred embodiment of the invention the coating of the substrate contains between 0 and 1 wt % of sodium in the top 10 nm of coating, as measured with XPS. The XPS measurement gives a sodium content of the top 10 nm of the coating of the substrate. Preferably, the amount of sodium is less then 0.5 wt % in the top 10 nm of coating.

The measurements can be performed in a Quantum 2000 from ULVAC-PHI (Q2). During the measurements the angle between the axis of the analyser and the sample surface should be 45°; the information depth is then about 7 nm. The measurements are performed using monochromatic $AlK_\alpha$ radiation (25 Watt) with a measuring spot of 100 μm, scanned over an area of about 1200×500 μm$^2$. By means of wide-scan measurements the elements present at the surface can be identified. Standard sensitivity factors are used to convert peak areas to atomic concentrations.

The coating of the present invention preferably has an arithmetic average roughness of about 2 to about 50 nm. The arithmetic average roughness can be measured by Atomic Force Microscopy (AFM) and is preferably about 2 nm or larger, more preferably about 5 nm or larger, even more preferably about 10 nm or larger, even more preferably about 20 nm or larger. The arithmetic average roughness preferably be about 50 nm or lower, more preferably 45 nm or lower.

When in use the coatings of the present invention exhibit voids in the coating thereby having a porous structure. The voids can aid in giving anti-reflective properties. Void volume is herewith defined as the space between the particle/binder which, depending on the environmental circumstances, is in principle filled with ambient air. Preferably the voids represent about 15% or more, by volume, of the coating. Preferably the voids represent about 20% or more, by volume, of the coating. Even more preferably the voids represent about 30% or more, by volume of the coating. Preferably the voids represent about 90% or less, by volume, of the coating. More preferably the voids represent about 80% or less, even more preferably 70% or less, by volume, of the coating.

While not wishing to be bound by any theory, it is believed that hygroscopic compounds that are present in the coating attract water and thereby foul the pores of the coating. When the pores of the coating are filled with water instead of air, properties such as anti-reflectiveness are adversely affected. The inventors have found that hygroscopic compounds such as sodium compounds tend to migrate to the coating when the coating is applied to a substrate and subsequently cured. This is a particular issue for float glass substrates.

The present coating is preferably such that, when measured for one coated side at a wavelength between 425 and 675 nm (the visible light region), the minimum reflection is about 2% or less, preferably about 1.5% or less, more preferably about 1% or less. The average reflection at one side, over the region of 425 to 675 nm preferably will be about 2.5% or less, more preferably about 2% or less, even more preferably about 1.5% or less, still more preferably about 1% or less. Generally, the minimum in the reflection will be at a wavelength between 425 and 650 nm, preferably at a wavelength of 450 nm or higher, and more preferably at 500 nm or higher. Preferably, minimum is at a wavelength of 600 nm or lower. The optimal wavelength for the human eye is a minimum reflection around 550 nm as this is the wavelength (colour) at which the human eye is most sensitive. In case a colour shade is required, a minimum at lower or higher wavelength can be chosen. The reflection can be measured with any suitable reflectometer or colorimeter as known to the skilled artisan. Generally, the reflection will show a slope or a curve over the 425-675 nm wavelength. The minimum is defined as either a minimum in a curve, or the lower end of the slope, being at 675 or at 425 nm.

Preferably, the reflection of a glass plate (with a coating on two sides) at the wavelength exhibiting a minimum is about 3% or less, preferably about 2% or less, more preferably about 1.5% or less. The average reflection over a 425-675 nm wavelength range is preferably about 4% or less, more preferably about 3% or less, even more preferred about 2.5% or less. Preferably, the reflection will be about 0.1% or higher, such as for example 0.2 or 0.4%.

Preferably, the light reflection reducing (or anti-reflective) coating is a coating that reduces the reflection of light from an article at least one wavelength between 425 and 675 nm as measured at the normal incident angle for about 30% or more. Measurements are carried out on the coated and uncoated article. Preferably the reduction in reflection is about 50% or more, more preferably about 70% or more, even more preferably about 85% or more. The reduction in reflection as expressed in a percentage is equal to 100× (reflection of the uncoated article—the reflection of the coated article)/(reflection of uncoated article).

The mechanical properties can be tested as steel wool resistance. Preferably, the coating has 'acceptable' steel wool resistance which is defined as less than 10 observable scratches after 10 rubs with 0000 steel wool with a loading of 250 g. More preferably, the steel wool resistance is 'good' which is defined 3 or less observable scratches after 10 rubs with 0000 steel wool with a loading of 250 g.

The coatings are prepared by applying coating compositions to the substrate and curing the coating compositions at an elevated temperature.

The coating compositions preferably comprise nano-particles, binder and preferably solvent.

The coating compositions herein may comprise a mixture of different types sizes and shapes of particles.

In one embodiment the particles used herein are non-spherical such as, preferably, rod-like or worm-like particles, preferably worm-like particles. Worm-like particles are particles having a central axis that deviates from a straight line. Examples of worm-like particles are known by the tradename Snowtex (IPA-ST-UP, particles have a diameter of 9-15 nm with a length of 40-300 nm), available from Nissan Chemical. Hereinafter, rod-like and worm-like particles are also denoted as elongated particles.

In a preferred embodiment the particles used herein are substantially spherical. Preferably the spherical particles have an average aspect ratio of about 1.2 or lower, preferably of about 1.1 or lower. Preferably the particles have an average size of about 10 nm or larger, preferably 20 nm or larger. Preferably the particles will have an average size of 200 nm or smaller, preferably 150 nm or smaller, even more preferably about 100 nm or smaller. Substantially spherical particles have the advantage that they form coatings where the volume of nano-pores resulting from the space between the particles is small relative to the volume formed by non-spherical particles. Thus the coatings suffer less from filling of the nano-pores via capillary forces which can cause a loss in performance. These particles may have a narrow or broad particle size distribution, preferably a broad particle size distribution.

The sizes of the particles may be determined by spreading a dilute suspension of the particles over a surface and measuring the sizes of individual particles by using microscopic techniques, preferably scanning electronic microscopy (SEM) or atomic force microscopy (AFM). Preferably the average sizes are determined by measuring the sizes of at least 100 individual particles. The aspect ratio is the ratio between the length and the width of a particle. In case of rods and worm-like particles the length is the largest distance between two points in the particle and the width is the largest diameter as measured perpendicular to the central axis of the particle. Both length and width are measured from the projection of the particles as observed under the microscope.

Examples of suitable particles include particles comprising lithium fluoride, calcium fluoride, barium fluoride, magnesium fluoride, titanium dioxide, zirconium dioxide, antimony doped tin dioxide, tin dioxide, aluminum oxide, silicon dioxide, and mixtures thereof. Preferably the particles comprise silicon dioxide. More preferably the particles comprise at least 90% by weight of silicon dioxide.

The nano-particles are preferably reacted with a surface modifying agent so that particles are obtained which are reactive with the binder. The surface modifying agent(s) react with the nano-particle to cause the particle to be activated so that it is more effectively able to react with the binder. The surface modifying agent is preferably one that is able to form oxides. Preferably, the surface modifying agent is a hydrolysable compound such as, for example, metal-alkoxide. Suitable examples include, but are not limited to, alkoxy silanes, alkoxy zirconates, alkoxy aluminates, alkoxy titanates, alkyl silicates, sodium silicates, and mixtures thereof. Preferably alkoxy silanes, more preferably tri and tetra alkoxy silanes, are used. Tetra alkoxy silane is more preferred.

In one embodiment of the invention, the reaction between the surface modifying agent and the particles is substantially complete. That is, virtually no free surface modifying agent is present in solution. The amount of agent is preferably at least about 1%, by weight, relative to the particles plus surface activating agent. More preferably the amount of agent is at least about 2%, by weight. The amount will generally be less than about 80%, by weight, preferably less than about 60%, by weight. A stable process and dispersion can be achieved with, for example, from 10 to 60%, by weight, of surface modifying agent relative to the particles plus surface modifying agent. With a higher amount of surface activating agent, the particles can be made 5, 10, or 20 nm larger in size, which may be advantageous.

In another embodiment, the reaction between the particles and surface modifying agent is not 'complete', but some binder is left in the solution. If this is the case, no or less binder has to be added during formulating the coating composition.

The reaction of the modifying compound and the particles is preferably such that the reaction is about 80% or more complete, more preferably about 90% or more. This appears to give an advantage with respect to the stability of the properties of the composition. It may be useful—in order to achieve a substantially complete reaction—to heat the reaction mixture. Suitable reaction temperatures include about 50° C. or higher, preferably 55° C. or higher, more preferably 65° C. or higher. Preferably, the temperature is about 100° C. or less, preferably about 80° C. or less.

It is possible to measure the extent of the reaction with GC and Karl-Fisher titration by measuring the amount of alkanol and water that has been liberated.

The compositions preferably comprise between about 0.1% and about 99.8%, by weight of the solid fraction, of surface-modified nano-particles, relative to the final coating composition. More preferably the compositions herein comprise from about 6% to about 85%, by weight of the solid fraction, of surface-modified nano-particles. Even more preferably the compositions herein comprise from about 10% to about 65%, by weight of the solid fraction, of surface-modified nano-particles.

Generally, the reaction is performed in a solvent. Depending on the chemistry of the binder, many solvents are useful. Suitable examples of solvents include water, non-protic organic solvents, and alcohols. Examples of suitable solvents include, but are not limited to, isopropanol, ethanol, acetone, ethylcellosolve, methanol, propanol, butanol, ethyleneglycol, propyleneglycol, methyl-ethyl-ether, methyl-butyl-ether, 1-methoxy propan-2-ol, toluene, methyl-ethyl-ketone, and mixtures thereof. Preferred are isopropanol, ethanol, methanol, propanol, and mixtures thereof.

In one embodiment of the invention, the reaction is performed in an organic solvent. Preferably, the amount of water will be about 5% or less, by weight, relative to the solvent. This is preferred because when the nano-particles have some acidity on their surface. If the acid groups are concentrated in sufficiently low amount of water, no catalyst is needed for the reaction between the surface modifying agent and the particles. In addition, the reaction preferentially takes place on or near the surface of the particles. Furthermore when the amount of acid catalyst in the coating composition is very low it can have benefits such as greater stability. More preferably, the amount of water is about 20 wt % or less, for example about 10%, 5% or less. Some water may be necessary in order to cause hydrolysis of the surface modifying compound. Preferably, the amount of water will be about 1% by weight or more, preferably about 2% by weight or more.

In a preferred embodiment of the invention about equal or more molar amounts of water is used relative to the molar amounts of hydrolysable groups. It is more preferred to use about 3 times or more of water than hydrolysable groups, even more preferred about 5 times or more. Preferably the relative molar amount of water is about 20 times or less than the molar amount of hydrolysable groups, more preferred about 15 times or less.

The coating composition as applied to substrate preferably comprises a binder, which has the primary function of keeping the surface activated particles attached to each other and the substrate. Preferably the binder forms covalent bonds with the particles and the substrate. For this purpose, the binder—before curing—preferably comprises inorganic compounds with alkyl or alkoxy groups. Further, the binder preferably polymerises itself to form a substantially continuous polymeric network.

Preferably the binder of the coating consists substantially of an inorganic binder. It has been found that such a coating shows very good mechanical properties and good adhesion to the substrate resulting in for example high puncture resistance, high scratch resistance and good wear resistance.

The inorganic binder is preferably derived from one or more inorganic oxides. Preferably the binder is a hydrolysable compound such as metal-alkoxides. Preferably the binder is selected from alkoxy silanes, alkoxy zirconates, alkoxy aluminates, alkoxy titanates, alkyl silicates, sodium silicates, and mixtures thereof. Preferred are alkoxy silanes, preferably tri and tetra alkoxy silanes. Preferably, ethyl silicate, aluminate, zirconate, and/or titanate binders are used. Tetra alkoxy silane is most preferred.

The amount of binder in the coating composition is preferably 1% or more, more preferably 2% or more, by weight of the solid fraction. Preferably the amount will be about 40% or less, more preferably 25% or less, by weight of the solid fraction. The percentage is calculated as the amount of metal oxide in the binder relative to the amount of metal oxide in the surface-modified nano-particles. Thus the percentage metal oxide of particles plus surface activating compound is used.

The pre-reaction of the binder composition may be performed with a compound to catalyze the conversion of the precursor into the oligomers. In case of alkoxy silane or ethyl silicate binders as the precursor preferably an acid, for example acetic acid may be used as the catalyst. The amount of catalyst can be relatively low, as only the binder has to react.

Preferably a catalyst is used in the prereaction of the binder composition. The presence of the catalyst brings the pH of the solution at about 2 or higher, more preferred about 3 or higher. The pH is preferably about 5.5 or lower, more preferred about 4.5 or lower. Suitable catalysts include, but are not limited to, organic acids like acetic acid, formic acid, nitric acid, citric acid, tartaric acid, inorganic acids like phosphoric acid, hydrochloric acid, sulphuric acid, and mixtures thereof, although acid with buffer capacity are preferred.

The pre-reaction is preferably performed in a solvent, which is preferably a mixture of water and an organic solvent. Depending on the chemistry of the binder, many solvents are useful. Suitable solvents include, but are not limited to, water, non-protic organic solvents, alcohols, and combinations thereof. Examples of suitable solvents include, but are not limited to, isopropanol, ethanol, acetone, ethylcellosolve, methanol, propanol, butanol, ethyleneglycol, propyleneglycol, methyl-ethyl-ether, methyl-butyl-ether, toluene, methyl-ethylketone, and combinations thereof.

In one embodiment of the invention, the prereaction of the binder composition is performed in an organic solvent. Preferably, the amount of water will be about 30%, by weight relative to the solvent or less, more preferably about 20%, by weight, or less.

In a preferred embodiment of the invention about equal or more molar amounts of water is used relative to the molar amounts of hydrolysable groups. It is more preferred to use about 3 times or more of water than hydrolysable groups, even more preferred about 5 times or more. Preferably the relative molar amount of water is about 30 times or less than the molar amount of hydrolysable groups, more preferred about 20 times or less.

The reaction is preferably performed at temperatures of about 25° C. or higher. Generally, the temperature will be about 100° C. or lower.

The reaction generally takes about 4 hours to 7 days. The extent of the reaction can be determined by testing the steel wool properties of the coating.

The coating composition may contain additional components, like for example further solvent, catalyst, hydrophobic agent, levelling agent, and the like.

A number of methods are available to apply thin coatings on substrates. Any method of applying a wet coating composition suitable for obtaining the required thickness would be acceptable. Preferred methods include meniscus (kiss) coating, spray coating, roll coating, spin coating, and dip coating. Dip coating is preferred, as it provides a coating on all sides of the substrate that is immersed, and gives a repeatable and constant thickness. Spin coating can easily be used if smaller glass plates are used, such as ones with 20 cm or less in width or length. Meniscus, roll, and spray coating is useful for continuous processes.

The coating preferably has a thickness of 1-10 µm before drying. The required wet thickness is dependant on the solid content of the coating. The thickness is generally measured after drying and curing, but may be measured after drying only, i.e. after evaporation of the non-reactive solvent(s). The thickness of the wet coating is influenced by the viscosity of the coating, and the dip speed in case of dip coating; each technique has its own ways to influence the thickness of a coating. The thickness of the coating when substantially dry (i.e. with about 20 wt % or less of non-reactive solvent relative to the solid material) is generally about 300 nm or less, preferably about 200 nm or less, most preferred about 170 nm or less. Generally, the dry, uncured coating will have a thickness of about 30 nm or more, preferable about 50 nm or more, most preferably about 60 nm or more. Thickness is measured either spectroscopically (reflectometery or ellipsometery) or by directly observing a fracture surface by electron microscopy.

In one embodiment the inorganic binder precursor is cross-linked and converted into the binder. This last step is generally carried out by heating to for example at about 150° C. or more, preferably about 200° C. or more. Preferably, the temperature will be about 700° C. or less, more preferably about 500° C. or less. Curing generally takes place in 30 seconds or more. Generally, curing is performed in 10 hours or less, preferably 4 hour or less.

In another embodiment, the binder is cured using a catalyst with temperatures of about 20° C. or more, and generally will be 200° C. or less, preferably 140° C. or less.

In one embodiment of the present invention, the curing temperature of the coating is less then 250° C. Curing at 'low' temperatures saves on energy costs and can reduce the amount of migration of hygroscopic material into the coating.

In one embodiment of the process, the coating application is applied to a glass plate before a tempering step of that glass plate. The tempering step is normally carried to introduce internal stresses in an ordinary glass plate by virtue of which it will fragment in small pieces when the glass breaks. The tempering step is usually carried out at temperature of up to 600° C. One advantage of the coating according to the invention is that the coating can withstand this tempering process and can even be cured before or during the tempering process. In the later case the curing and tempering process are thus carried out in one step.

Generally, in case of flat substrates such as glass plates, at least one side of the substrate needs to be coated e.g. in case a product is glued to the other (non-coated) side of the substrate. However, in one embodiment of the invention, the substrate is a glass plate that has a coating on both sides. This may be achieved by coating both sides of a glass plate. It is also possible to laminate two glass plates which are coated on one side, whereby the non-coated sides are laminated to each other. It is preferred that a glass plate in use has on both outermost sides a coating, more preferred, an anti-reflective coating. It is, however, also possible to combine different techniques to obtain anti-reflective or anti-glare properties. In one embodiment one side of a glass plate is coated with an anti-reflective coating made with a process according the present invention, and the other side of the glass is laminated with a transparent film with an anti-glare or anti-reflective coating, preferably a coating made according the present invention; the coatings according the present invention may be the same or different in chemical composition. In a further embodiment of the invention the film used to stick two glass plates together may be a UV absorbing film in order to lend UV shielding properties to the picture or image.

Other useful functionalities include anti-fogging, anti-fouling, anti-stick, easy-clean, lubricious, antistatic, low-emission coatings (such as low-heat emission), and the like.

For all coating processes, cleaning of the substrate is an important step, as small amounts of contaminant such as dust, grease and other organic compounds cause an anti-reflective coating, or other coatings, to show defects. Cleaning can be done in a number of ways, such as firing (heating up to 600-700° C.; applicable if an inorganic substrate is used); and/or cleaning with a cleaning fluid such as soap in demineralised water, alcohol, or acidic or basic detergent systems. When using a cleaning fluid, generally, the glass plate is dried at a temperature between 20° C. and 400° C., optionally with applying an air flow.

In one embodiment, the process for making an anti-reflective substrate comprises the step of cleaning the substrate.

In one embodiment of the present invention a coating layer is applied to the substrate that reduces migration of sodium to the coating layer. The blocking layer is preferably provided on the glass before applying the porous coating. One preferred example of a blocking layer is a layer comprising $CeO_2$. Other examples of blocking layers include aluminium oxide, zinc oxide, titanium oxide, tin oxide, zirconium oxide, niobium oxides, tantalum oxides, silicon oxides, and mixtures thereof.

The blocking layer may also have other functions such as the ability to block UV-light.

In one embodiment the present invention comprises a process for making the article having a porous coating the process comprising the steps of:

(i) reacting nano-particles with a binder to form a porous coating composition;

(ii) applying the coating composition to a substrate;
(iii) curing the coating;
(iv) washing the cured coating.

In another embodiment the present invention comprises a process for making the article having a porous coating the process comprising the steps of:
(i) reacting nano-particles with an amount of surface modifying agent;
(ii) pre-hydrolysing a binder;
(iii) mixing the surface modified particles from step (i) with the pre-hydrolysed binder from step (ii);
(iv) applying the coating composition to a substrate;
(v) curing the coating;
(vi) washing the cured coating.

The washing step (vi) is added to the process to remove any hygroscopic material from the coating and may be performed with demineralised water, tap water, or solvents that are suitable to dissolve the hygroscopic material. Examples of suitable solvents are diluted acids of for example formic acid, acetic acid, benzoic acid, sulphuric acid, nitric acid, hydrochloric acid, phosphoric acid and the like.

It is believed that the hygroscopic material comprises salts of sodium, like for example sodium hydroxide and sodium carbonate. The skilled man will be able to determine suitable solvents from his general knowledge and skill without undue experimentation.

EXAMPLES

The present invention is further illustrated with a number of examples that should however not limit the scope of the present invention.

Example 1

Cleaning of Aged Coated Glass Plates

A composition was prepared by reacting the components as given in Table 1.

TABLE 1

| Component | | Amount | Wt % |
|---|---|---|---|
| Isopropanol (IPA) | | 123.7 | 59.3 |
| IPA-ST-UP | (15.6% $SiO_2$) | 30.93 | 14.8 (2.31% $SiO_2$) |
| TEOS[1] | (28.8% $SiO_2$) | 23.2 | 11.1 (3.19% $SiO_2$) |
| Water | | 30.93 | 14.8 |
| Isopropanol | additional | 570 | To 1.5 wt % $SiO_2$ |

[1]Tetraethylorthosilicate

The isopropanol was mixed with IPA-ST-UP particles and surface-modification agent (TEOS) was added with stirring. After 5 mins the water was added. The composition was stirred and heated to 80° C. for 4 hours. 20 g of binder (prehydrolysed TEOS) was added to the composition.

Thin films of the composition were prepared on a glass slide (20×20 cm) by the following procedure. A glass plate was washed and dried thoroughly to prepare it for the dip coating process. The glass slide was then lowered into the coating formulation. It was drawn out of the formulation with a certain speed thus depositing a thin liquid layer of the coating formulation on the glass plate. After evaporation of the solvent the dried inorganic coating was cured in an oven for 4 hours at 450° C. to ensure complete curing.

The coated glass sample gave a reflection of 1.1%, measured at a wavelength of 520 nm, and had a steel wool resistance of A.

The reflection was measured using a Minolta CM-2600D spectrophotometer under standard conditions.

The coated glass was stored for 2 weeks and reflection was measured. Reflection had increased by 0.6-0.7%. Some glass plates were cleaned by rinsing the plates with different solvents such as demineralised water (DI water), tap water, or diluted solutions of acetic acid and phosphoric acid, for 30 seconds at room temperature. The plates were subsequently dried in the ambient air for 1 hour. Reflection went down to values around the original reflection of two weeks earlier. The glass was stored again for two weeks. It turned out that the reflectivity of the unwashed glass had increased to values higher then 2% after 4 weeks (Table 2).

TABLE 2

| Example | Solvent | t = 0 days | t = 14 days | t = 14 days + rinse | t = 28 days |
|---|---|---|---|---|---|
| CE1 | None | 1.1 | 1.8 | 1.8 | 2.3 |
| 1.1 | DI water | 1.1 | 1.7 | 0.9 | 1.1 |
| 1.2 | Tap-water | 1.1 | 1.6 | 1.1 | 1.3 |
| 1.3 | 1% acetic acid | 1.1 | 1.6 | 1.0 | 1.2 |
| 1.4 | 1% phosphoric acid | 1.1 | 1.8 | 0.9 | 1.1 |

Sample 1.1 contained approximately 2.5% Sodium after curing in the upper 7 nm of the coating. After rinsing with DI-water this dropped to 0.1-0.5%.

It was surprising that the loss in anti-reflectivity that was seen in the first 14 days was not repeated in the second 14days despite identical storage conditions.

Example 2

Cleaning of Freshly Coated Glass Plates

Glass plates (comprising between 13 and 15 wt % sodium oxide) were coated with an AR coating, according to the procedure as detailed in Example 1. The initial reflection of the glass plates was 1.0%, measured at a wavelength of 520 nm (The reflection being measured using a Minolta CM-2600D spectrophotometer under standard conditions).

Some glass plates were cleaned by rinsing the plates with DI water for 30 seconds at room temperature, and subsequently dried in the ambient air for 1 hour. The glass was stored for two weeks. Reflectivity of not washed glass had increased to values higher then 2% after 2 weeks (see table 3, CE2 and CE3). Washed plates (two weeks old) had a reflectivity comparable to the freshly made plates (Table 3).

TABLE 3

| Example | Solvent used for rinse | T = 0 days | t = 0 days + rinse | t = 14 days |
|---|---|---|---|---|
| CE2 | None | 1.1 | 1.2 | 2.2 |
| 2.1 | DI-water | 1.0 | 0.8 | 1.1 |

Example 3

Low Sodium Glass

An AR-coating was prepared on a borosilicate glass, comprising about 5 wt % of sodium oxide according to the procedure as detailed in Example 1. The coated glass had a reflectivity of 1,0%. 5 Months later the reflectivity had only increased to 1.3% while reflectivity of soda lime glass plates (13-15 wt % sodium oxide) had increased to 2.6%.

Example 4

Curing at 250° C.

Glass substrates comprising between 13 and 15 wt % sodium oxide were coated with the AR coating composition according to Example 1. Two glass plate was cured at 450° C. for 4 hours, the other two at a temperature of 250° C., during 4 hours.

Stability of the glass plates was tested, whereby some plates were rinsed with demineralised water (Table 4).

| Example | Solvent used for rinse | T = 0 days | t = 0 days + rinse | t = 14 days |
|---|---|---|---|---|
| CE2 | None | 1.1 | 1.2 | 2.2 |
| 4.1 | None | 0.9 | 1.0 | 1.3 |
| 4.2 | DI-water | 0.8 | 0.7 | 0.9 |

Example 5

Blocking Layer

A glass substrate comprising between 13 and 15 wt % sodium oxide was coated with a $CeO_2$ layer. For this 60 g $CeO_2$ particles (36 nm in size) dispersed in water and IPA (5.66 wt %) was reacted with 6.55 g TEOS in 4 hours at room temperature. 94 g of IPA was added to dilute the formulation. The glass slide was then lowered into the coating formulation. It was drawn out of the formulation with a certain speed thus depositing a thin liquid layer of the coating formulation on the glass plate. After evaporation of the solvent the dried inorganic coating was left on the glass plate. After application of the $CeO_2$ layer, the substrate was coated with the coating composition described in Example 1 and cured at 450° C. as described in Example 1. Results are summarized in table 5.

TABLE 5

| Example | Solvent used for rinse | t = 0 days | t = 0 days + rinse | t = 14 days |
|---|---|---|---|---|
| CE2 | None | 1.1 | 1.2 | 2.2 |
| 5.1 | None | 0.3 | 0.3 | 0.6 |
| 5.2 | DI-water | 0.4 | 0.4 | 0.5 |

Example 5 shows that application of a blocking coating dramatically lowers the reflection of the object. It also shows that addition of a $CeO_2$-UV-blocking layer further improves the stability of the coated object.

The invention claimed is:

1. A method of making an article with anti-reflective properties comprising the steps of:
   (i) reacting nano-particles with an amount of surface modifying agent;
   (ii) pre-hydrolysing an inorganic binder;
   (iii) mixing the surface modified particles from step (i) with the pre-hydrolysed binder from step (ii) to form a coating composition;
   (iv) applying the coating composition to a substrate that includes hygroscopic sodium salt compounds;
   (v) forming a cured coating by curing the coating composition and causing the hygroscopic sodium salt compounds to migrate into the cured coating at a curing temperature of between about 200° C. to about 700° C. and causing the hygroscopic sodium salt compounds to migrate into the cured coating;
   (vi) washing the cured coating with water or a solvent for the hygroscopic sodium salt compounds for about 30 seconds sufficient to remove the hygroscopic sodium salt compounds from the cured coating and thereby obtain an article having a reflectivity of less than 2% after storage for 28 days and having an amount of sodium measured in the coating by XPS of less than 1 wt %.

2. The method according to claim 1, wherein the curing temperature of step (v) is between 200° C. and 500° C.

3. The method according to claim 1, wherein the reflectivity of the article is less than 1%.

4. The method according to claim 1, wherein the substrate is glass.

5. The method according to claim 4, wherein the substrate comprises between 0 and 7 wt % of sodium oxide.

6. The method according to claim 1, which further comprises providing a blocking layer between the coating and the substrate.

7. The method according to claim 6, wherein the blocking layer comprises $CeO_2$.

8. The method according to claim 1, wherein the coating has an arithmetic average roughness of about 2 to about 50 nm.

9. A method of making an article with anti-reflective properties comprising the steps of:
   (i) forming a coating composition by reacting nano-particles with an inorganic binder selected from the group consisting of alkoxy silanes, alkoxy zirconates, alkoxy aluminates, alkoxy titanates, alkyl silicates, sodium silicates and mixtures thereof;
   (ii) applying the coating composition to a substrate that includes hygroscopic sodium salt compounds;
   (iii) obtaining a cured coating by curing the applied coating composition at a curing temperature between about 200° C. to about 700° C. to form a porous coating and causing the hygroscopic sodium salt compounds to migrate into the cured coating; and
   (iv) washing the cured coating with water or a solvent for the hygroscopic sodium salt compounds for about 30 seconds sufficient to remove the hygroscopic sodium salt compounds and thereby obtain an article having a reflectivity of less than 2% after storage for 28 days and having an amount of sodium measured in the coating by XPS of less than 1 wt %.

10. The method according to claim 9, wherein the curing temperature of step (iii) is between 200° C. and 500° C.

11. The method according to claim 9, wherein the reflectivity of the article is less than 1%.

12. The method according to claim 9, wherein the substrate is glass.

13. The method according to claim 12, wherein the substrate comprises between 0 and 7 wt % of sodium oxide.

14. The method according to claim 9, which further comprises providing a blocking layer between the coating and the substrate.

15. The method according to claim 14, wherein the blocking layer comprises $CeO_2$.

16. The method according to claim 9, wherein the coating has an arithmetic average roughness of about 2 to about 50 nm.

17. The method according to claim 9, wherein the inorganic binder is tetra alkoxy silane.

18. The method according to claim 9, wherein the inorganic binder is present in the coating composition in an amount of 1% to 40%, by weight of solids.

19. The method according to claim 9, wherein step (iv) comprises drying the cured coating in ambient air for about 1 hour after washing.

20. The method according to claim 9, wherein step (iv) is practiced by washing the cured coating with a dilute acid solvent for hygroscopic salt compounds selected from the group consisting of formic acid, acetic acid, benzoic acid, sulphuric acid, nitric acid, hydrochloric acid and phosphoric acid.

* * * * *